(12) United States Patent
Nomura

(10) Patent No.: US 9,150,053 B2
(45) Date of Patent: Oct. 6, 2015

(54) PNEUMATIC TIRE

(75) Inventor: Seiji Nomura, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 436 days.

(21) Appl. No.: 13/537,499

(22) Filed: Jun. 29, 2012

(65) Prior Publication Data

US 2013/0025755 A1 Jan. 31, 2013

(30) Foreign Application Priority Data

Jul. 29, 2011 (JP) .................................. 2011-167315

(51) Int. Cl.
*B60C 11/01* (2006.01)
*B60C 13/02* (2006.01)

(52) U.S. Cl.
CPC ................ *B60C 11/01* (2013.01); *B60C 13/02* (2013.01)

(58) Field of Classification Search
CPC ........ B60C 11/01; B60C 13/02; B60C 13/023
USPC ............................................ 152/209.16, 523
See application file for complete search history.

(56) References Cited

U.S. PATENT DOCUMENTS

| | | | | |
|---|---|---|---|---|
| 3,568,747 | A | * | 3/1971 | Fletcher et al. ............... 152/154 |
| 3,818,964 | A | * | 6/1974 | Maiocchi .................. 152/209.16 |
| 5,803,999 | A | * | 9/1998 | Shibata ..................... 152/209.14 |
| 6,920,906 | B2 | * | 7/2005 | Allison et al. ............ 152/209.16 |
| 8,056,592 | B2 | * | 11/2011 | Missik-Gaffney et al. ............................ 152/209.8 |
| 8,434,534 | B2 | * | 5/2013 | Barton ..................... 152/209.16 |
| 2006/0254684 | A1 | * | 11/2006 | Tamura ..................... 152/209.18 |
| 2009/0159166 | A1 | * | 6/2009 | Sakamoto ................ 152/209.16 |
| 2010/0180994 | A1 | * | 7/2010 | Yamaguchi ................... 152/153 |

FOREIGN PATENT DOCUMENTS

| | | | |
|---|---|---|---|
| CA | 2006573 | | 7/1990 |
| JP | 07-052613 | * | 2/1995 |
| JP | 2004-291936 | * | 10/2004 |
| JP | 2004-291937 | * | 10/2004 |
| JP | 2004-291938 | * | 10/2004 |
| JP | 2006-182179 | * | 7/2006 |
| JP | EP1834812 | * | 9/2007 |

OTHER PUBLICATIONS

English machine translation of JP2004-291937, dated Oct. 2004.*
English machine translation of JP07-052613, dated Feb. 1995.*

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A pneumatic tire comprises buttress parts each provided with a row of protrusions arranged circumferentially of the tire. The protrusion has a radially outside wall surface rising from the surface of the buttress part, a radially inside wall surface rising from the surface of the buttress part, and a top surface extending between the radially inside wall surface and the radially outside wall surface. The radially outside wall surface starts to rise from the surface of the buttress part at a certain distance from the tread edge so that the minimum radial distance Kmin from the tread edge to the protrusions is in a range of from 5 to 15 mm.

9 Claims, 7 Drawing Sheets

PNEUMATIC TIRE

BACKGROUND OF THE INVENTION

The present invention relates to a pneumatic tire, more particularly to a structure of buttress which can be incorporated in a winter tire as well as summer tire to improve snow performance, especially lateral grip performance without sacrificing other performances.

Heretofore, in order to improve snow performance, block type tread patterns made up of siped blocks are usually employed and the percentage of the grooved area of the pattern is increased.

In such measures, however, with increase in the percentage of the grooved area, the pattern rigidity is decreased, and there is a tendency that the steering stability during running on dry roads is deteriorated. Further, as the groove volume is increased, there is a tendency that the following noise sound increases: a pitch sound generated when the groove edges contact with the ground; a pumping sound generated when air compressed in a groove jets out; and a resonance sound generated when air in a wide circumferential groove is resonated.

Canada Patent Application Publication No. 2006573 discloses a pneumatic tire which can be improved in snow performance without sacrificing other performances. As shown in FIG. 7, this tire is provided in the buttress parts (a) with rib-like protrusions (c). In order to improve the traction during running on snowy roads, the rib-like protrusion is provided on both sides in the tire circumferential direction with wall surfaces (CS) protruding from the surface of the buttress part (a). The rib-like protrusion (c) has a top surface (c) which merges into the surface of the buttress part (a). Such rib-like protrusions can not improve lateral grip on snowy roads in order to prevent side skid.

SUMMARY OF THE INVENTION

It is therefore, an object of the present invention to provide a pneumatic tire, in which snow performance especially lateral grip is improved to prevent side skid during running on snowy roads, without sacrificing other performances.

According to the present invention, a pneumatic tire comprises
a tread portion having a tread surface and tread edges,
a pair of bead portions,
a pair of sidewall portions extending between the tread portion and the bead portions and each having a buttress part as its radially outermost part extending radially inwardly from the tread edge,
the surface of the buttress part provided with a row of protrusions arranged circumferentially of the tire, wherein
each of the protrusions has a radially outside wall surface rising from the surface of the buttress part, a radially inside wall surface rising from the surface of the buttress part, and a top surface extending between the radially inside wall surface and the radially outside wall surface, and
the radially outside wall surface starts to rise from the surface of the buttress part at a certain distance from the tread edge so that the minimum radial distance Kmin from the tread edge to the protrusion is in a range of from 5 to 15 mm.

Further, the pneumatic tire according to the present invention may be provided with the following optional features:
the radial width W of the protrusion is at least 1 mm and at most 10 mm;
the radially inside wall surface is provided in its circumferential central part with an indentation denting toward the radially outside;
the tire has round shoulders such that the surface of the buttress part smoothly merges into the tread surface 2S without forming an angled corner;
the protruding height Hi of the inside wall surface from the surface of the buttress part is more than the protruding height Ho of the outside wall surface from the surface of the buttress part.

Therefore, when side skid starts during running on a snowy road, since the tire sinks in the snow, the radially inside wall surfaces of the protrusions are caught on the snowy road and resist against the side skid. Thus lateral grip is improved.

on the other hand, during running on non-snow-covered roads, since the minimum radial distance Kmin is 5 mm or more, the protrusions hardly contact with the road surface even if rutted asphalt road, therefore, negative effects on other performances, e.g. steering stability and the like, which are possible when contacting with the road surface, can be avoid.

As explained, this effect to improve the lateral grip on snowy roads can be obtained regardless of winter tires or summer tires. Therefore, the present invention can be applied to not only winter tires but also summer tires.

when applied to a summer tire, even in a combination with a ladder type tire chain which can provide big traction but lateral grip, owing to the protrusions the lateral grip is increased, and good snow performance may be provided.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure is uniformly defined by 180 kPa.

The tread edges are the axial outermost edges of the ground contacting patch (camber angle=0) in the normally inflated loaded condition.

The tread width is the axial distance between the tread edges measured in the normally inflated unloaded condition of the tire.

DESCRIPTION OF THE PREFERRED EMBODIMENTS

Embodiments of present invention will now be described in detail in conjunction with accompanying drawings.

Figure 1:
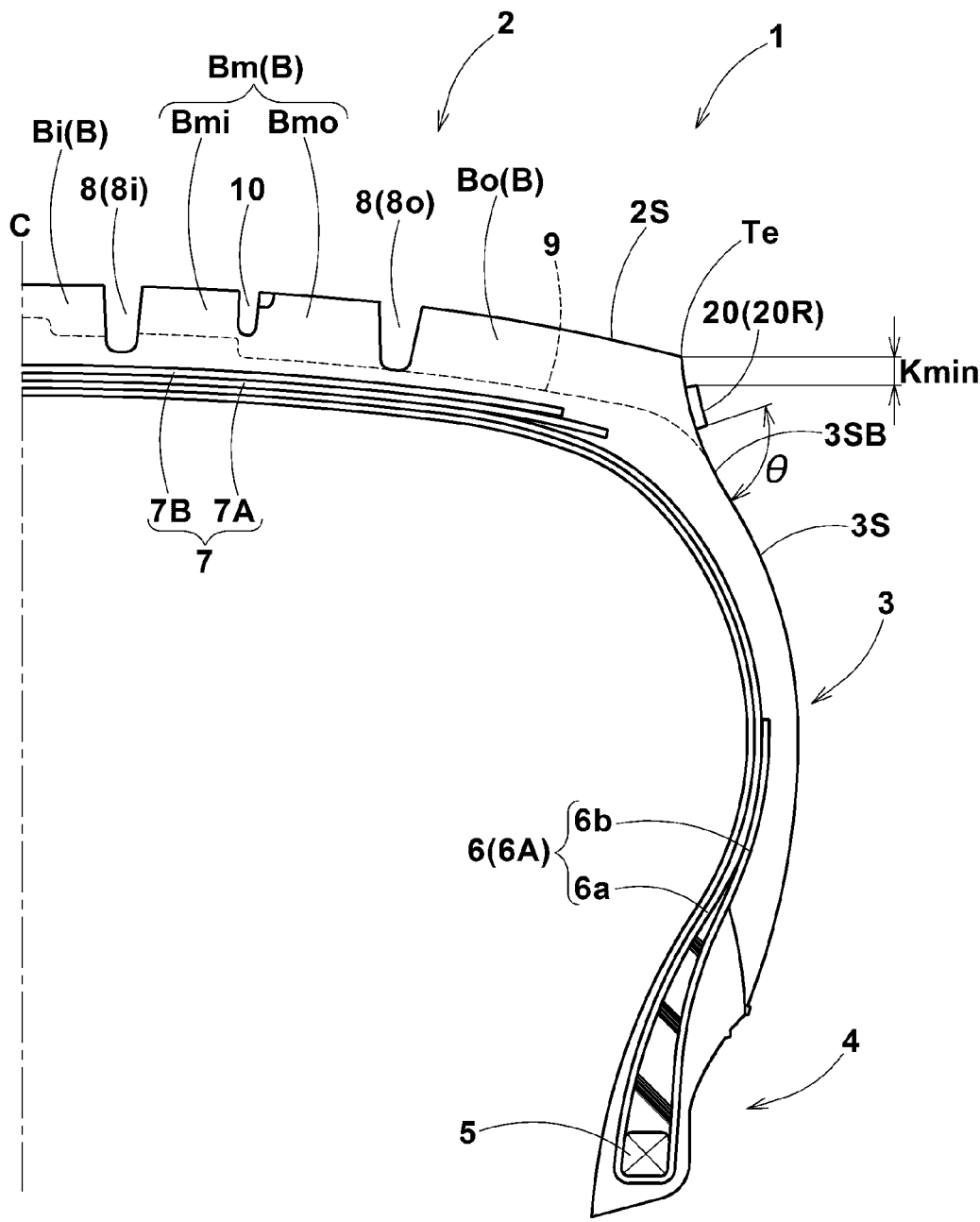
FIG. 1 is a cross sectional view of a pneumatic tire as an embodiment of the present invention.

According to the present invention, as shown in FIG. 1, pneumatic tire 1 comprises a tread portion 2, a pair of sidewall portions 3, a pair of bead portions 4 each with a bead core 5 therein, a carcass 6 extending between the bead portions 4 through the tread portion 2 and sidewall portions 3, and a belt 7 disposed radially outside the carcass 6 in the tread portion.

In the following embodiments, the pneumatic tire 1 according to the present invention is a passenger car tire.

The carcass 6 is composed of at least one ply 6A of cords arranged radially at an angle in a range of from 75 to 90 degrees with respect to the tire equator C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this example, the carcass 6 is composed of a single ply 6A of cords arranged radially at an angle of 90 degrees with respect to the tire equator C.

The belt 7 comprises at least two cross plies 7A and 7B of high modulus cords, e.g. steel cord and the like, for example laid at angles of 10 to 40 degrees with respect to the tire circumferential direction to reinforce the almost entire width of the tread portion 2. The belt 7 in this example is composed of only the two cross plies 7A and 7B, each made of cords laid parallel with each other so that the cords in one ply cross the cords in the other ply.

Figure 2:
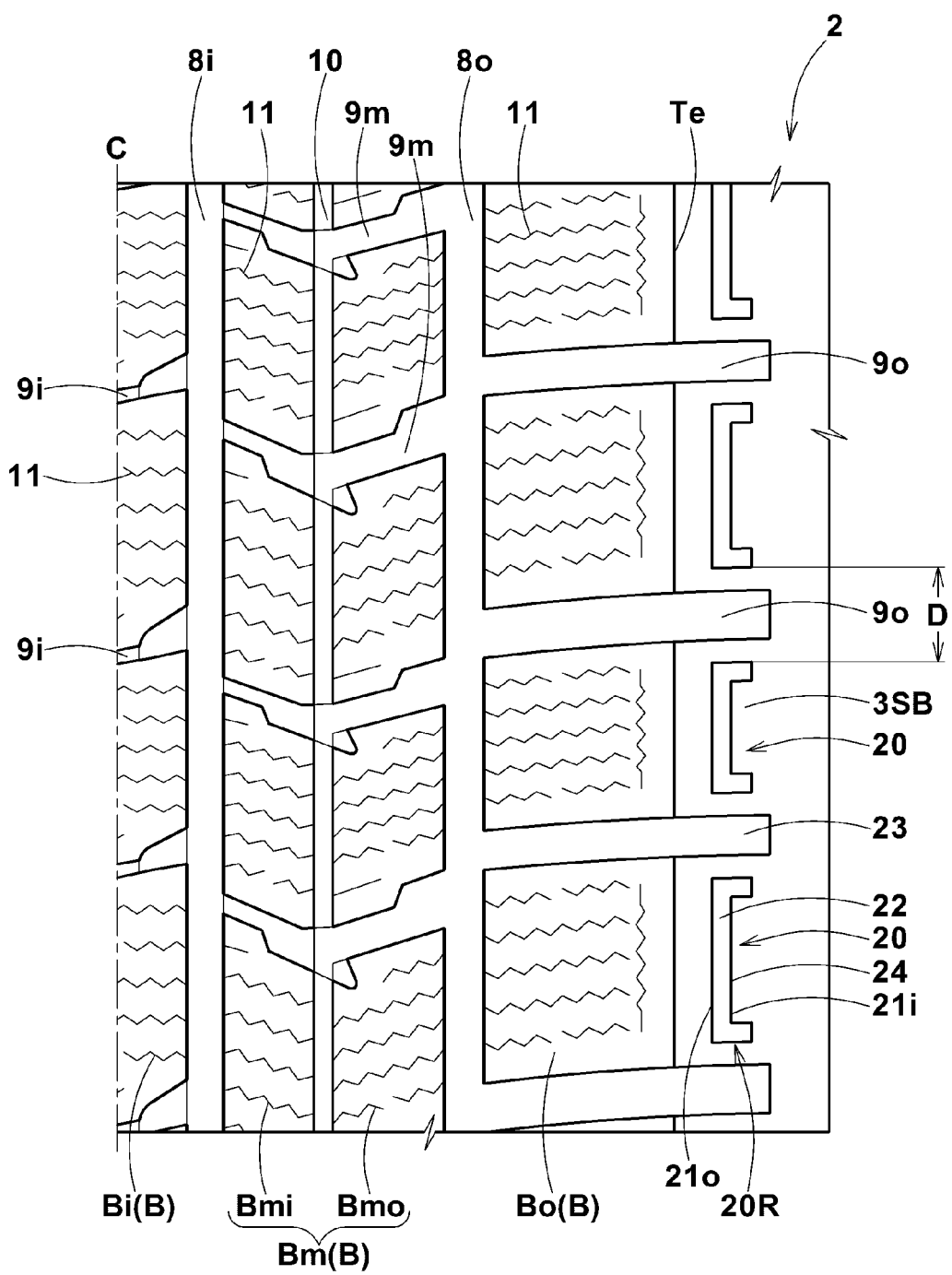
FIG. 2 is a developed partial plan view of the tread portion thereof showing a tread pattern.

In the embodiment shown in FIG. 1 and FIG. 2, the pneumatic tire 1 is a studless tire.

The tread portion 2 is provided with tread grooves including: a plurality of main circumferential grooves 8 extending continuously in the tire circumferential direction; and a plurality of lateral grooves 9 extending crosswise to the main circumferential grooves 8 so that a tread portion 2 is divided into a plurality of blocks B defining a block type pattern.

The blocks B are each provided with a plurality of axially extending sipes 11.

The main circumferential grooves 8 in this example are an axially inner main circumferential groove 8i and an axially outer main circumferential groove 8o which are disposed on each side of the tire equator C.

The annular region between the two axially inner main circumferential grooves 8i is circumferentially divided by the axially inner lateral grooves 9i into a row of axially inner blocks Bi which are arranged circumferentially of the tire.

Each annular region between the axially inner and outer main circumferential grooves 8i and 8o is circumferentially divided by the middle lateral grooves 9m into a row of middle blocks Bm which are arranged circumferentially of the tire.

Each annular region axially outside the axially outer main circumferential groove 8o is circumferentially divided by the axially outer lateral grooves 9o into a row of axially outer blocks BO which are arranged circumferentially of the tire.

In this embodiment, a narrow circumferential groove 10 extending circumferentially of the tire is disposed between the axially inner and outer main circumferential grooves 8i and 8o so as to subdivide the middle block row into a circumferential row of axially inside middle blocks BMi and a circumferential row of axially outside middle blocks Bmo.

The pneumatic tire 1 according to the present invention is provided on the surface 3SB of each buttress part with a row 20R of protrusions 20 arranged circumferentially of the tire at intervals.

The surface 3SB of the buttress part is defined as a radially outer part of the surface 3s of the sidewall portion 3 which part extends radially inwardly from the tread edge Te.

Figure 3:
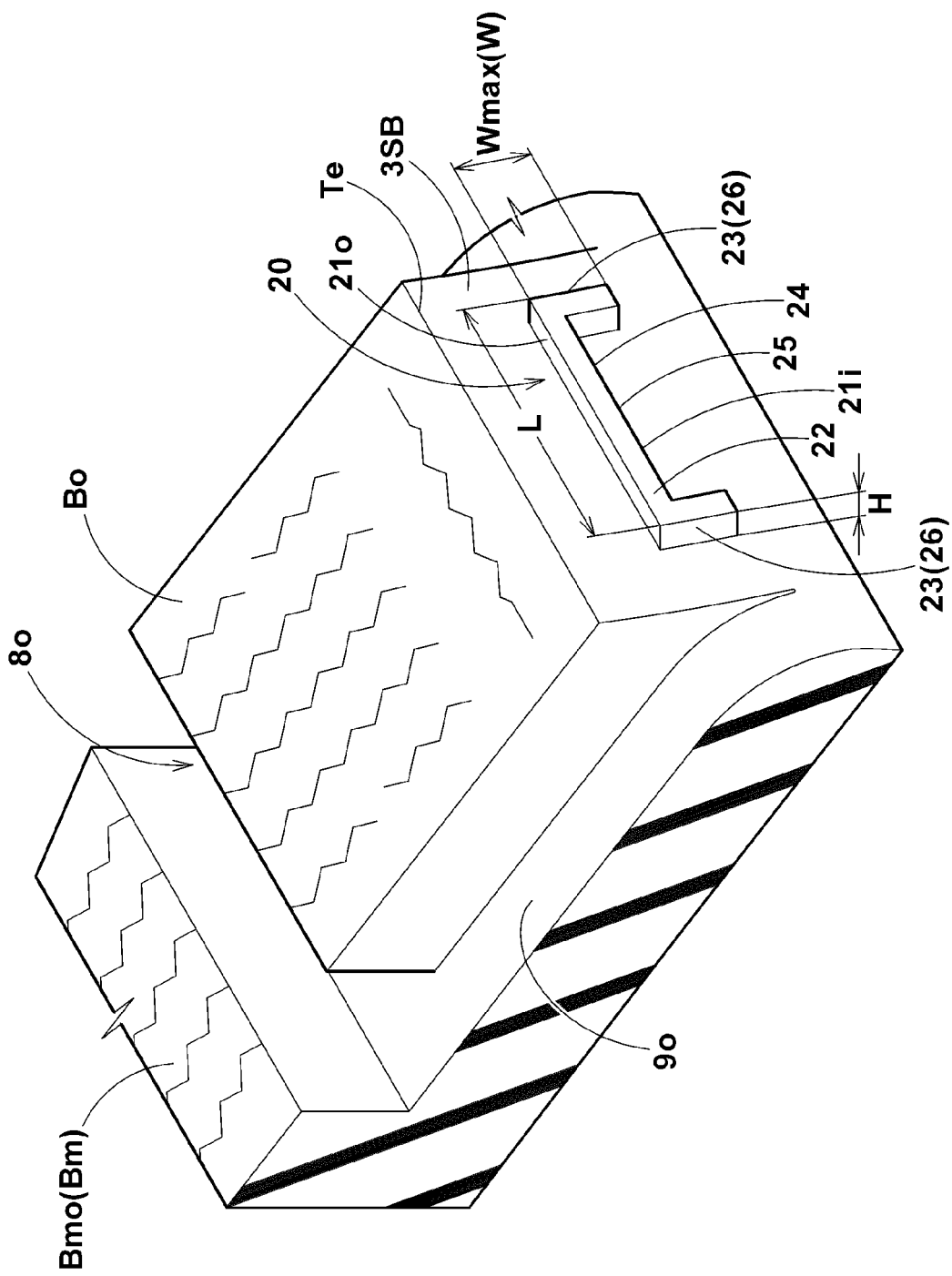
FIG. 3 is a perspective view showing a protrusion.
Figure 4:
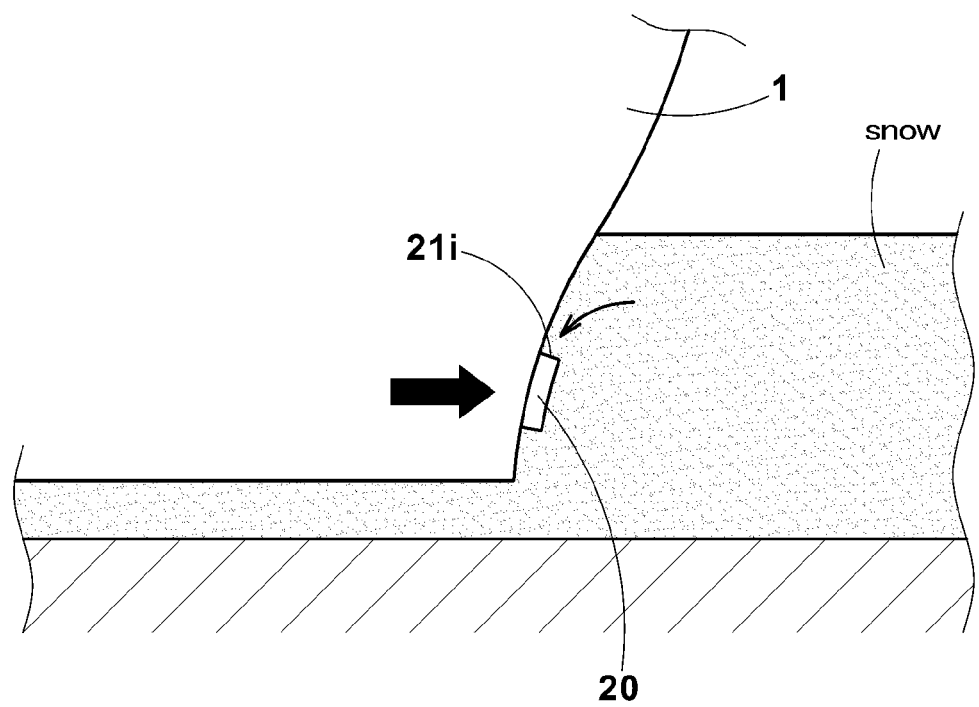
FIG. 4 is a cross sectional view of the protrusion for explaining its function.

As shown in FIG. 3, the protrusion 20 starts to protrude from the surface 3SB of the buttress part at a certain distance radially inward from the tread edge Te and extends radially inwardly and also extends in the tire circumferential direction so that the circumferential length L becomes more than the radial width W, namely to have a circumferentially long shape.

The protrusion 20 has a radially inside wall surface 21i and a radially outside wall surface 21o which are rising from the surface 3SB of the buttress part and a top surface 22 (or axially outer surface) extending between the radially inside and outside wall surfaces 21i and 21o.

It is preferable that the circumferential length L of the protrusion 20 is in a range of from 5 to 30 mm, and the protruding height H of the protrusion 20 from the surface 3SB of the buttress part is in a range of from 1 to 3 mm.

The radial width W of the protrusion 20 along the surface 3SB of the buttress part is at least 1 mm and at most 10 mm.

The minimum radial distance Kmin from the tread edge Te to the protrusion 20 is set in a range of from 5 to 15 mm. In the case of FIG. 1, the minimum radial distance Kmin occurs between the tread edge Te and the outer edge of the radially outside wall surface 21o.

Therefore, when side skid starts during running on a snowy road, since the tire sinks in the snow, the radially inside wall surfaces 21i of the protrusions 20 are caught on the snowy road and resist against the side skid. Thus lateral grip is improved.

Since the minimum radial distance Kmin is 5 mm or more, when running on dry roads (even if rutted asphalt roads), the protrusions 20 hardly contact with the road surface, therefore, it is possible to avoid negative effects on other performances, e.g. steering stability and the like.

Further, the protrusion 20 is provided on both sides in the tire circumferential direction with sidewall surfaces 23 which are rising from the surface 3SB of the buttress part. Therefore, the sidewall surfaces 23 are caught in the snowy road and can provide traction. Thus, on-the-snow performances can be effectively improved.

If the length L is less than 5 mm or the height H is less than 1 mm, then the area of the inside wall surface 21i becomes insufficient to increase the lateral grip.

If the radial width W is less than 1 mm, the strength of the protrusion 20 becomes insufficient.

If the radial width W is more than 10 mm, the depth of the inside wall surface 21i from the snow surface is decreased, and the friction against the snow is decreased, therefore, it becomes difficult to improve the lateral grip.

If the height H is more than 3 mm, the protrusion 20 easily bents, and it becomes difficult to firmly engage with a hard snowy road surface to improve the lateral grip.

In a circumferential center part of the inside wall surface 21i, an indentation 24 denting toward the radially outside can be provided in order to more grasp the snow to increase the resistance and thereby to improve lateral grip. All of or some of the protrusions 20 may be provided with such indentation 24.

Due to the indentation 24, the protrusion 20 is provided with a minimum width portion 25 where the radial width W becomes minimum. The radial width W increases stepwisely or smoothly from the minimum width portion 25 toward each end of the protrusion 20 in the circumferential direction, and the circumferential ends are formed as a maximum width portion 26 where the radial width W becomes maximum in order to secure the area of the sidewall surfaces 23 capable of providing traction.

Even if the radial width W is varied, the maximum value Wmax of the radial width W is limited in the above-mentioned range (1 to 10 mm).

In the example shown in FIGS. 2 and 3, the inside wall surface 21i is provided with a U-shaped indentation 24, and the radial width W increases stepwisely from the minimum width portion 25 toward the circumferential ends (or sidewall surfaces 23).

Figure 5A:
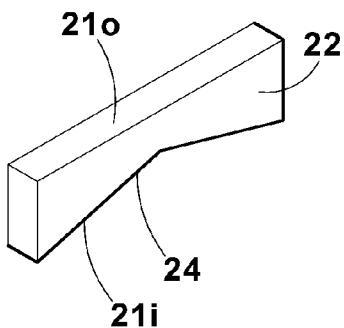
FIGS. 5(A)-5(H) are perspective views each showing another example of the protrusion.
Figure 5B:
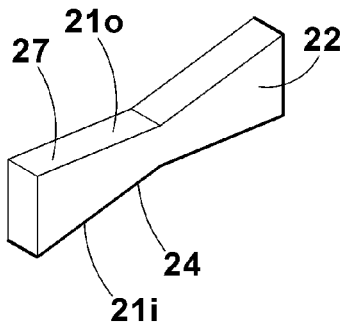
Figure 5C:
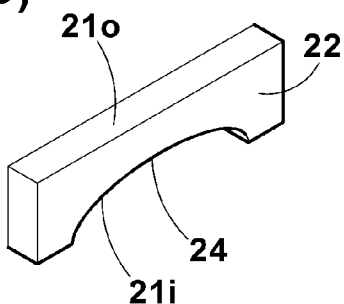
Figure 5D:
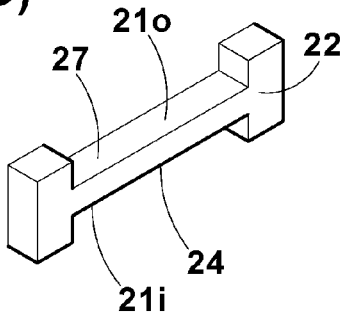
Figure 5E:
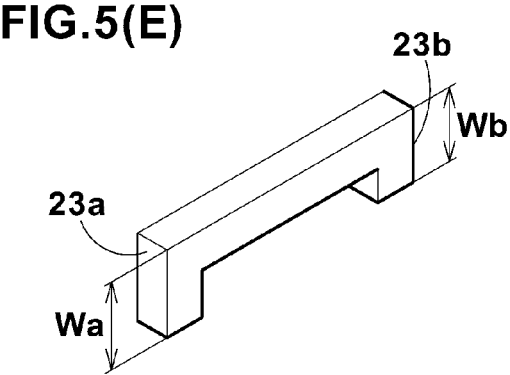
Figure 5F:
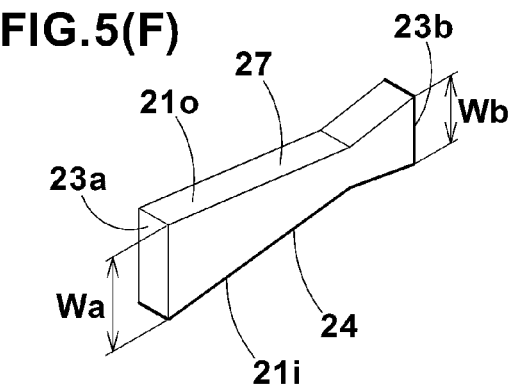
Figure 5G:
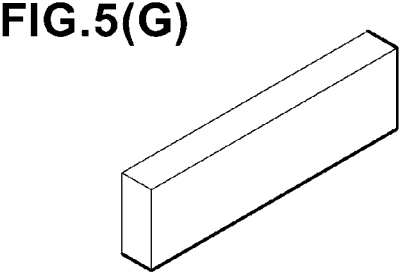

However, it is also possible to use indentations having various shapes for example, v-shape as shown in FIGS. 5(A), 5(B) and 5(F), arc-shape as shown in FIG. 5(c) and the like, alone or in combination (inclusive of the U-shape).

Further, as shown in FIGS. 5(B), 5(D) and 5(F) for example, the outside wall surface 21o may be provided with an indentation 27 denting toward the radially inside, alone or in combination with the indentation 24 in the inside wall surface 21i.

In any case, in order to secure a sufficient friction against the snow, it is preferred that the inside wall surface 21i including the indentation 24 intersects the surface 3SB of the buttress part at an angle of from 90 to 45 degrees. Specifically, as shown in FIG. 1, in the cross section of the tire including the tire rotational axis, the angle θ between the inside wall surface 21i and the surface 3SB of the buttress part is set in a range of from 90 to 45 degrees.

This is also true in the case of the sidewall surfaces 23 and the outside wall surface 21o, namely, their intersecting angles with the surface 3SB of the buttress part are preferable set in the range of from 90 to 45 degrees.

Figure 5H:
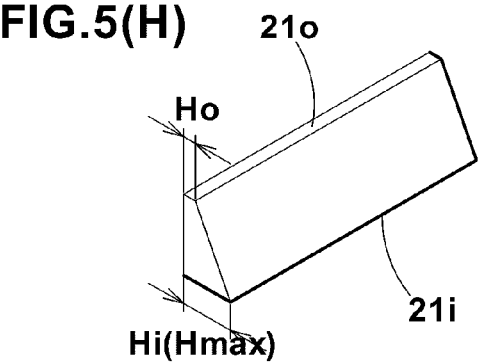

Further. in order to increase the friction and thereby to improve lateral grip, it is preferred that as shown in FIG. 5(H), the protruding height Hi of the inside wall surface 21i from the surface 3SB of the buttress part is more than the protruding height Ho of the outside wall surface 21o from the surface 3SB of the buttress part. In this case, it is possible to lower the chance of the protrusion getting contact with small objects such as stones on the road surface and also the road surface itself during cornering.

Even if the protruding height H is varied, the maximum value Hmax of the protruding height H is set in the above-mentioned range (1 to 3 mm).

Further, it is desirable that the maximum value Hmax occurs at the radially inside wall surface 21i regardless of whether the indentation 24 is formed or not. In other words, the radially inside wall surface 21i has the maximum value Hmax along its entire circumferential length.

The circumferential distances (intervals) D of the protrusions 20 in the row 20R is preferably set in a range of from 15 to 40 mm. If more than 40 mm, since the number of the protrusions 20 is decreased, it becomes difficult to improve on-the-snow performances. If less than 15 mm, it becomes difficult for the sidewall surfaces 23 to engage with the snow, therefore, the traction can not be increased.

In the case that the tread pattern is a unidirectional pattern, it is preferable that as shown in FIGS. 5(E) and 5(F), the radial width Wa of the heel-side outer end surface 23a of the protrusion is more than the radial width Wb of the toe-side outer end surface 23b of the protrusion in order to increase the traction. Incidentally, the "heel-side" and the "toe-side" correspond to the rear side and front side, respectively, observed in the ground contacting patch of the tire in the traveling direction when the tire rotates in its intended rotational direction.

In the embodiment shown in FIG. 1, the pneumatic tire 1 has so called square shoulders where the surfaces 3SB of the buttress parts intersect the tread surface 2S, forming angled corners.

Figure 6A:
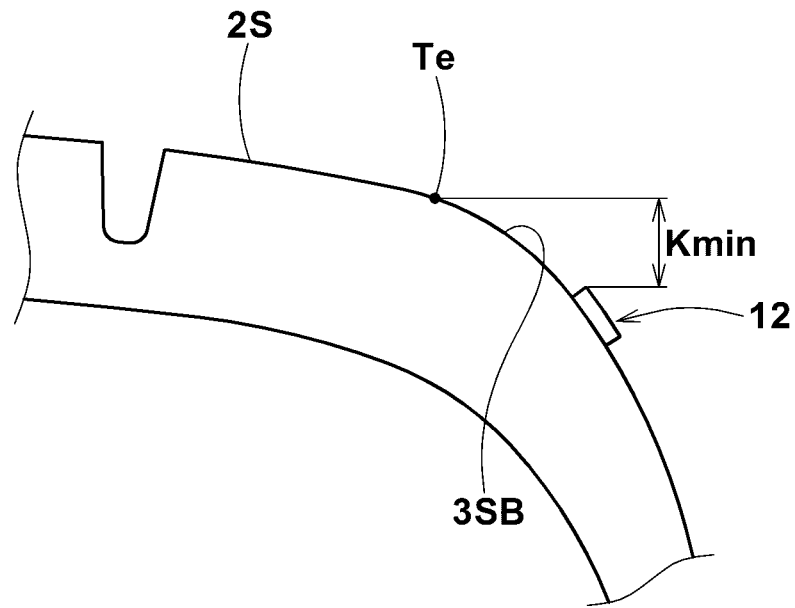
FIG. 6(A) is a cross sectional partial view of a pneumatic tire as another embodiment of the present invention having round shoulders.

FIG. 6(A) shows another embodiment in which the pneumatic tire 1 has so called round shoulders where the surfaces 3SB of the buttress parts merge into the tread surface 25.

The protrusion 20 can exert its function more effectively when combined with such round shoulders.

Figure 6B:
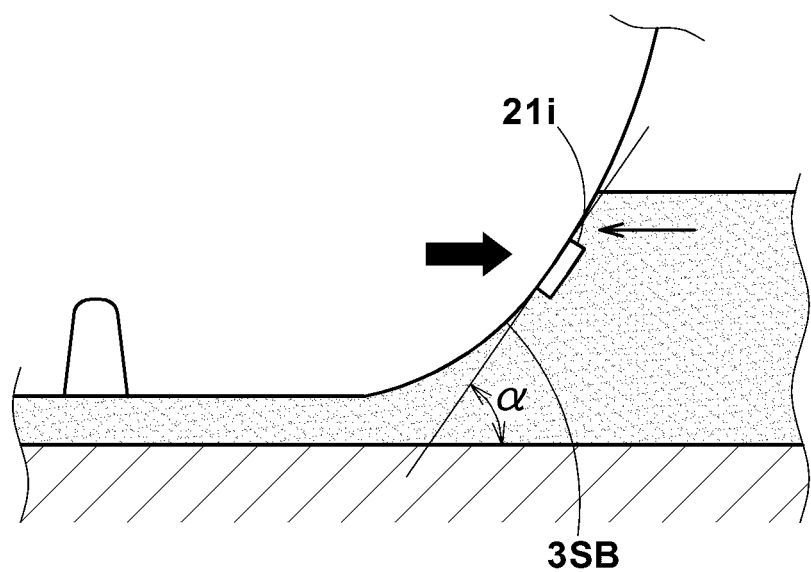
FIG. 6(B) is a cross sectional view of the protrusion for explaining its function.
Figure 7:
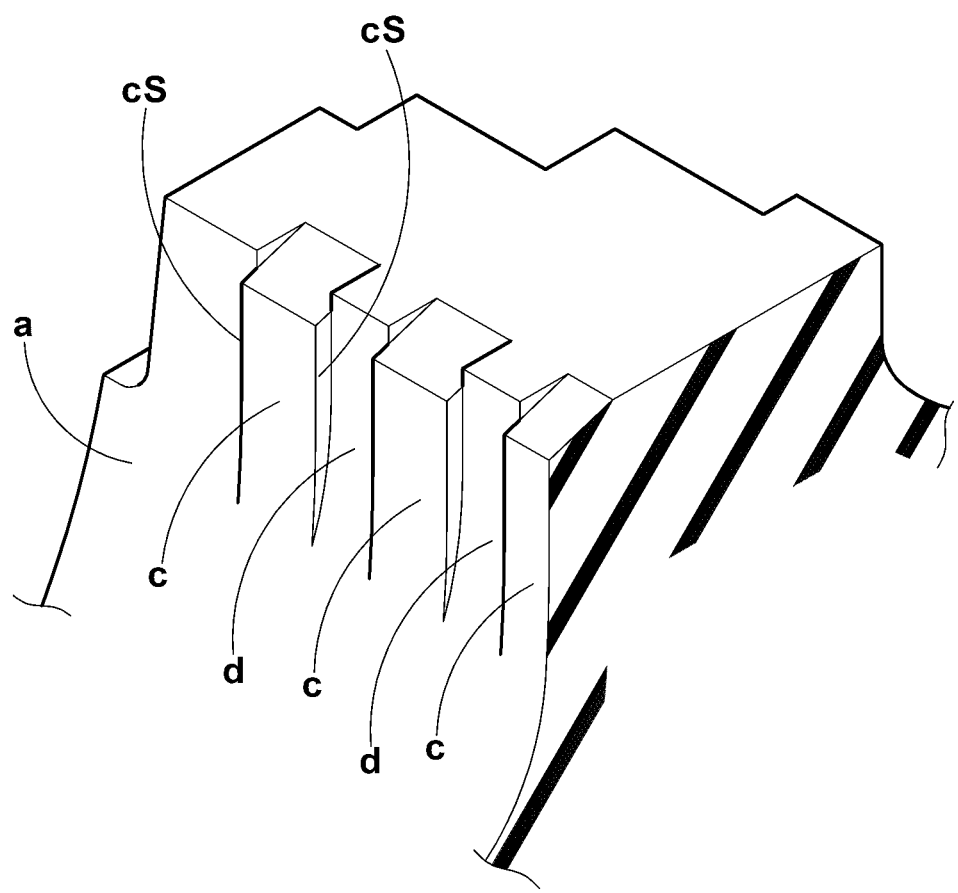
FIG. 7 is a perspective partial view of a buttress part of a prior art tire showing protrusions.

Originally, a tire with square shoulders has a reasonable lateral grip performance owing to the angled corners at the tread edges Te. In contrast, a tire with round shoulders is inferior in the lateral grip since there is no angled corner at the tread edges Te. In the case of round shoulders, as shown in FIG. 6(B), the angle α of the surface 3SB of the buttress part with respect to the road surface is smaller than that in the square shoulders. Therefore, when side skid starts, the protrusions 20 formed on the round shoulders exert their function to provide lateral grip more effectively than in the square shoulders.

The above explained embodiments are studless tires. But, the present invention can be applied to a summer tire. It can be said that a primary difference in appearance of a summer tire from a studless tire is that a large number of sipes are not provided. In other words, the tread patter shown in FIG. 2 may be employed in a summer tire by reducing the number of sipes 11.

As can be seen from the above description, the protrusions 20 are almost independent from tread patterns, the tire types whether summer tire or winter tire, and the shoulder types whether square or round.

Comparison Test (1)

In order to confirm advantageous effects of the present invention, studless tires of size 195/65R15 having the internal structure shown in FIG. 1 and the block type tread pattern shown in FIG. 2 were prepared and tested for snow performance. The tires had square shoulders as shown in FIG. 1, and the surface of each buttress part was provided with fifty six protrusions at regular circumferential pitches. Except for the specifications shown in Table 1, all of the tires had identical specifications.

In the test, the tires mounted on 15×6.5J rims and inflated to 200 kPa were installed on a test car (Japanese 2000 cc FF passenger car). The test car was run on a snowy road in a tire test course under an ambient temperature of −5 degrees C., and the traction and lateral grip were evaluated into ten ranks by the test driver.

The results are shown in Table 1, wherein the larger the value, the better the performance.

TABLE 1

| Tire | Ref. 1 | Ref. 2 | Ex. 1 | Ex. 2 | Ex. 3 | Ref. 3 | Ex. 4 | Ex. 5 | Ex. 6 | Ex. 7 |
|---|---|---|---|---|---|---|---|---|---|---|
| Protrusions | none | | | | | | | | | |
| shape (FIG. no.) | — | 3 | 3 | 3 | 3 | 3 | 3 | 3 | 3 | 3 |
| Kmin (mm) | — | 0 | 5 | 10 | 15 | 20 | 10 | 10 | 10 | 10 |
| L (mm) | — | 20 | 20 | 20 | 20 | 20 | 5 | 30 | 20 | 20 |
| W (mm) | — | 5 | 5 | 5 | 5 | 5 | 5 | 5 | 10 | 5 |
| H (mm) | — | 2 | 2 | 2 | 2 | 2 | 2 | 2 | 2 | 1 |
| Snow performance | | | | | | | | | | |
| traction | 4 | 5 | 8 | 9 | 8 | 5 | 9 | 7 | 9 | 7 |
| lateral grip | 4 | 4 | 8 | 9 | 8 | 5 | 7 | 9 | 7 | 7 |

| Tire | Ex. 8 | Ex. 9 | Ex. 10 | Ex. 11 | Ex. 12 | Ex. 13 | Ex. 14 | Ex. 15 | Ex. 16 | Ex. 16 |
|---|---|---|---|---|---|---|---|---|---|---|
| Protrusions | | | | | | | | | | |
| shape (FIG. no.) | 3 | 5(A) | 5(B) | 5(C) | 5(D) | 5(E) | 5(F) | 5(G) | 5(G) | 5(H) |
| Kmin (mm) | 10 | 10 | 10 | 10 | 10 | 10 | 10 | 10 | 10 | 10 |
| L (mm) | 20 | 20 | 20 | 20 | 20 | 20 | 20 | 20 | 20 | 20 |
| W (mm) | 5 | 5 | 5 | 5 | 5 | 5 | 5 | 5 | 1 | 5 |
| H (mm) | 3 | 2 | 2 | 2 | 2 | 2 | 2 | 2 | 2 | 2 |
| Snow performance | | | | | | | | | | |
| traction | 9 | 7 | 7 | 7 | 9 | 9 | 7 | 7 | 5 | 8 |
| lateral grip | 10 | 9 | 9 | 9 | 9 | 9 | 9 | 9 | 9 | 9 |

As shown in Table 1, studless tires according to the present invention were improved in the lateral grip.

Comparison Test (2)

Summer tires of size 175/65R15 having the internal structure shown in FIG. 1 and a rib type tread pattern (not shown) were prepared and tested for snow performance using ladder type tire chains. The tires had round shoulders as shown in FIG. 6(A), and the surface of each buttress part was provided with seventy eight protrusions at regular circumferential pitches. Except for the specifications shown in Table 2, all of the tires had identical specifications.

The test was carried out in the same way as above. The results are shown in Table 2, wherein the larger the value, the better the performance.

As shown in Table 2. summer tires according to the present invention were also improved in the lateral grip in combination with the ladder type tire chains.

The invention claimed is:
1. A pneumatic tire comprising a tread portion having a tread surface and tread edges, a pair of bead portions, and a pair of sidewall portions extending between the tread portion and the bead portions and each having a buttress part as its radially outermost part extending radially inwardly from the tread edge, the surface of the buttress part provided with a row of protrusions arranged circumferentially of the tire, wherein each said protrusion has (a) a radially outside wall surface rising from the surface of the buttress part, (b) a radially inside wall surface rising from the surface of the buttress part, and a

TABLE 2

| Tire | Ref. 1 | Ref. 2 | Ex. 1 | Ex. 2 | Ex. 3 | Ref. 3 | Ex. 4 | Ex. 5 | Ex. 6 | Ex. 7 |
|---|---|---|---|---|---|---|---|---|---|---|
| Protrusions | none | | | | | | | | | |
| shape (FIG. no.) | — | 3 | 3 | 3 | 3 | 3 | 3 | 3 | 3 | 3 |
| Kmin (mm) | — | 0 | 5 | 10 | 15 | 20 | 10 | 10 | 10 | 10 |
| L (mm) | — | 20 | 20 | 20 | 20 | 20 | 5 | 30 | 20 | 20 |
| W (mm) | — | 5 | 5 | 5 | 5 | 5 | 5 | 5 | 10 | 5 |
| H (mm) | — | 2 | 2 | 2 | 2 | 2 | 2 | 2 | 2 | 1 |
| Snow performance | | | | | | | | | | |
| traction | 1 | 2 | 4 | 5 | 5 | 3 | 4 | 4 | 5 | 3 |
| lateral grip | 1 | 2 | 6 | 6 | 6 | 4 | 4 | 7 | 6 | 4 |

| Tire | Ex. 8 | Ex. 9 | Ex. 10 | Ex. 11 | Ex. 12 | Ex. 13 | Ex. 14 | Ex. 15 | Ex. 16 | Ex. 16 |
|---|---|---|---|---|---|---|---|---|---|---|
| Protrusions | | | | | | | | | | |
| shape (FIG. no.) | 3 | 5(A) | 5(B) | 5(C) | 5(D) | 5(E) | 5(F) | 5(G) | 5(G) | 5(H) |
| Kmin (mm) | 10 | 10 | 10 | 10 | 10 | 10 | 10 | 10 | 10 | 10 |
| L (mm) | 20 | 20 | 20 | 20 | 20 | 20 | 20 | 20 | 20 | 20 |
| W (mm) | 5 | 5 | 5 | 5 | 5 | 5 | 5 | 5 | 1 | 5 |
| H (mm) | 3 | 2 | 2 | 2 | 2 | 2 | 2 | 2 | 2 | 2 |
| Snow performance | | | | | | | | | | |
| traction | 6 | 4 | 4 | 4 | 5 | 5 | 5 | 4 | 2 | 3 |
| lateral grip | 6 | 6 | 6 | 6 | 6 | 6 | 6 | 6 | 6 | 6 | top surface extending between the radially inside wall surface and the radially outside wall surface,
wherein
the radially outside wall surface starts to rise from the surface of the buttress part at a certain distance from the tread edge so that the minimum radial distance Kmin from the tread edge to the protrusion is in a range of from 5 to 15 mm,
the radially inside wall surface is provided in its circumferential central part with an indentation denting toward the radially outside so that the protrusion is provided with a minimum width portion where a radial width (W) of the protrusion is minimum and the radial width (W) of the protrusion increases stepwisely or alternatively smoothly from the minimum width portion toward each end of the protrusion in the circumferential direction, said each end of the protrusion being spaced apart from a lateral groove circumferentially adjacent to the axially outermost block, and a circumferential length (L) of the protrusion being more than the radial width (W) so that the protrusion has a circumferentially long shape, and
the tread portion is provided with axially outermost blocks which are arranged along each said tread edge and of which axially outer side walls each define a part of said surface of the buttress part, and each said protrusion is disposed within one of the axially outer side walls and has an angle θ in a range of from 90 to 45 degrees between its radially inside wall surface and the surface of the buttress part.

2. The pneumatic tire according to claim 1, wherein the surface of the buttress part smoothly merges into the tread surface without forming an angled corner.

3. The pneumatic tire according to claim 1, wherein the protruding height Hi of the inside wall surface from the buttress part surface is more than the protruding height Ho of the outside wall surface from the buttress part surface.

4. The pneumatic tire according to claim 1, wherein each said protrusion has a circumferential length less than that of the axially outer side wall of the block provided with the protrusion concerned.

5. The pneumatic tire according to claim 1, wherein a protruding height H of each said protrusion from the surface of the buttress part is in a range of from 1 to 3mm.

6. The pneumatic tire according to claim 5, which is a studless tire provided in the tread portion with a block type tread pattern made up of blocks including said axially outermost blocks, each block provided with a plurality of sipes.

7. The pneumatic tire according to claim 1, which is a studless tire provided in the tread portion with a block type tread pattern made up of blocks including said axially outermost blocks, each block provided with a plurality of sipes.

8. The pneumatic tire according to claim 7, wherein said radially inside wall surface is substantially parallel with the tire circumferential direction.

9. The pneumatic tire according to claim 7, wherein said radially outside wall surface is substantially parallel with the tire circumferential direction.

\* \* \* \* \*